(12) United States Patent
Cunningham et al.

(10) Patent No.: US 8,958,964 B2
(45) Date of Patent: Feb. 17, 2015

(54) METHOD FOR INCREASING VACUUM PRODUCTION FOR A VEHICLE

(71) Applicant: Ford Global Technologies, LLC, Dearborn, MI (US)

(72) Inventors: Ralph Wayne Cunningham, Milan, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 13/912,942

(22) Filed: Jun. 7, 2013

(65) Prior Publication Data

US 2014/0365094 A1    Dec. 11, 2014

(51) Int. Cl.
*B60W 10/02* (2006.01)
*B60W 10/04* (2006.01)
*B60W 10/06* (2006.01)

(52) U.S. Cl.
CPC ............... *B60W 10/02* (2013.01); *B60W 10/06* (2013.01); *Y10S 477/901* (2013.01)
USPC ............................... 701/68; 477/174; 477/901

(58) Field of Classification Search
USPC .............. 701/67, 68; 477/171, 173, 174, 180, 477/181, 901
See application file for complete search history.

(56) References Cited

U.S. PATENT DOCUMENTS

| | | | | |
|---|---|---|---|---|
| 2,259,774 A | * | 10/1941 | Perkins | 477/168 |
| 3,921,773 A | * | 11/1975 | Dietrich | 192/83 |
| 4,105,100 A | * | 8/1978 | Iijima | 477/168 |
| 5,816,979 A | * | 10/1998 | Shiiba et al. | 477/176 |
| 6,296,592 B1 | | 10/2001 | Eguchi et al. | |
| 6,533,081 B2 | | 3/2003 | Totsuka et al. | |
| 6,675,758 B2 | | 1/2004 | Nagata et al. | |
| 7,152,933 B2 | | 12/2006 | Collins et al. | |
| 8,229,642 B2 | | 7/2012 | Post, II et al. | |
| 8,285,465 B2 | | 10/2012 | Wu et al. | |
| 2005/0230210 A1 | * | 10/2005 | Arnold et al. | 192/21 |
| 2007/0216224 A1 | | 9/2007 | Schmitt et al. | |

FOREIGN PATENT DOCUMENTS

WO          9600844  A1      1/1996

OTHER PUBLICATIONS

Pursifull, Ross D. et al., "Method for Preventing Wheel Spin on Stopped Vehicles," U.S. Appl. No. 14/284,201, filed May 21, 2014, 37 pages.

* cited by examiner

*Primary Examiner* — Edwin A Young
(74) *Attorney, Agent, or Firm* — Julia Voutyras; Alleman Hall McCoy Russell Tuttle LLP

(57) ABSTRACT

Methods and systems for providing vacuum to a vehicle are described. In one example, a method adjusts an application force of a transmission clutch in response to a request for additional vacuum.

20 Claims, 5 Drawing Sheets

METHOD FOR INCREASING VACUUM PRODUCTION FOR A VEHICLE

FIELD

The present description relates to methods and systems for operating an engine that produces vacuum for a vehicle. The methods and systems may be particularly useful for engines that are boosted and that operate at high altitudes.

BACKGROUND AND SUMMARY

Vehicle engines may be downsized to conserve fuel and reduce engine emissions. Smaller engines may operate more frequently at higher intake manifold pressures as compared to larger engines in the same vehicle. Engine pumping losses may be reduced by operating an engine with higher intake manifold pressures, but the opportunities to provide engine vacuum to the vehicle vacuum system may be reduced. Some attempts to increase vacuum production have included ejectors, ways of advantageously controlling engine throttle position, and various other control strategies. However, many of these systems and methods require hardware that is additional to more conventional engines. Consequently, vehicle cost may be higher for such systems.

The inventors herein have recognized the above-mentioned disadvantages and have developed a method for operating a vehicle powertrain, comprising: reducing torque delivered from an engine to vehicle wheels via reducing a torque transferred via a clutch in response to a request for increased vacuum.

At very low vehicle speed (e.g. less than 6 to 10 kph), torque or force produced by a vehicle engine tends to purposefully accelerate a vehicle while the operator's foot is off the accelerator pedal. This is called creep force. By reducing an amount of engine torque that is provided to vehicle wheels (creep torque) when no driver demand torque is present, it may be possible to provide a technical result of an engine providing an increased amount of vacuum for vacuum consumers. For example, if an engine is operating at idle speed and X Nm of torque is provided by the engine to vehicle wheels to maintain a positive torque at the wheels, it may be possible to reduce engine torque from X Nm to Y Nm while continuing to operate the engine at the same idle speed such that additional intake manifold vacuum is produced. In particular, since less engine torque is used to operate the engine at Y Nm than at X Nm, the engine can operate using a reduced air charge, and the reduced air charged is provided via throttling the engine and allowing less air into the engine intake manifold so that intake manifold pressure is reduced and vacuum is increased. In this way, the desired technical result of providing additional vacuum may be achieved.

The present description may provide several advantages. Specifically, the approach may improve an amount of vacuum available for a vehicle. Further, the approach may not be noticeable to a driver. In addition, the approach may reduce an amount of time that it takes an engine to produce a desired amount of vacuum.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example, referred to herein as the Detailed Description, when taken alone or with reference to the drawings, where.

DETAILED DESCRIPTION

Figure 1:
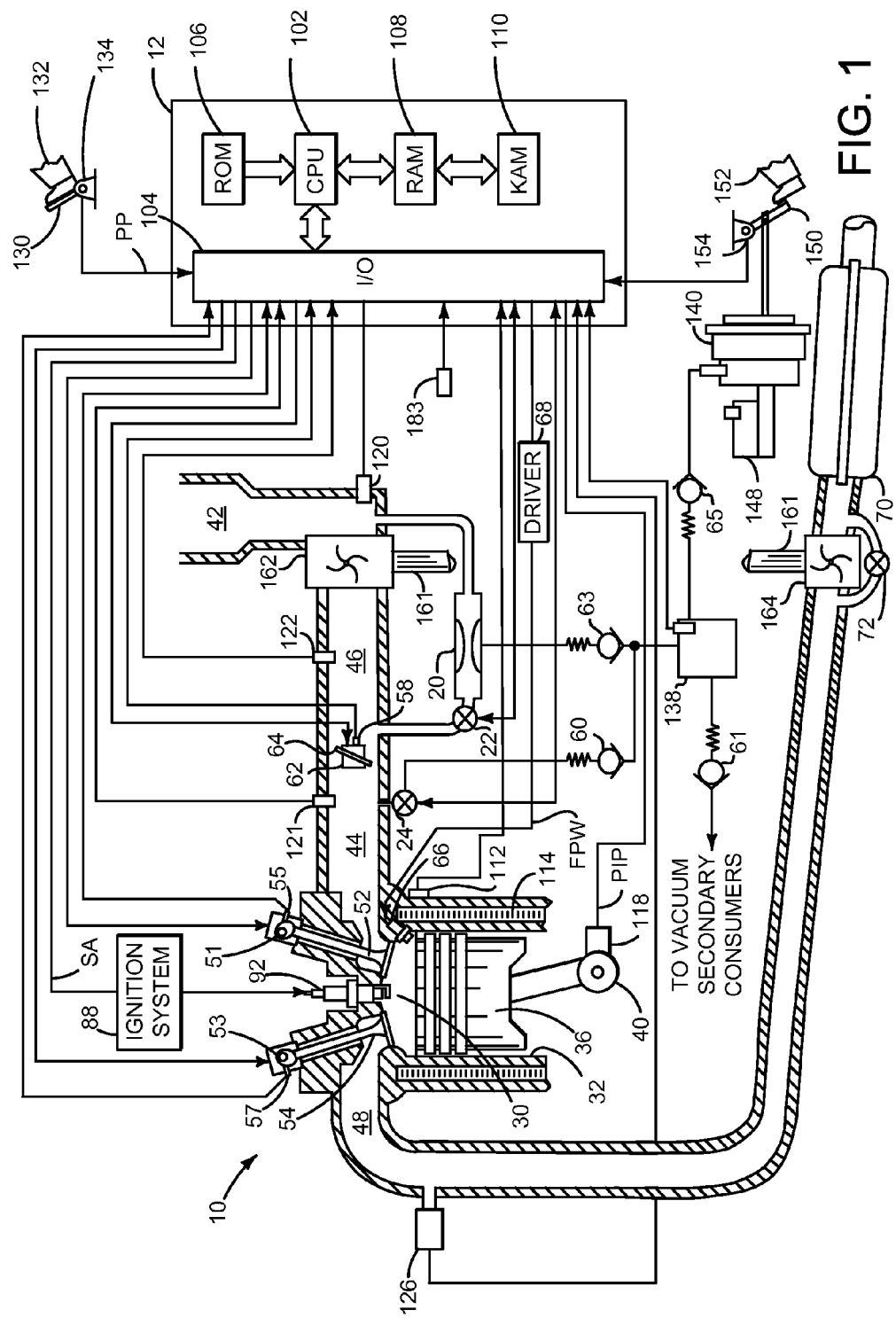
FIG. 1 is a schematic diagram of an engine.
Figure 2:
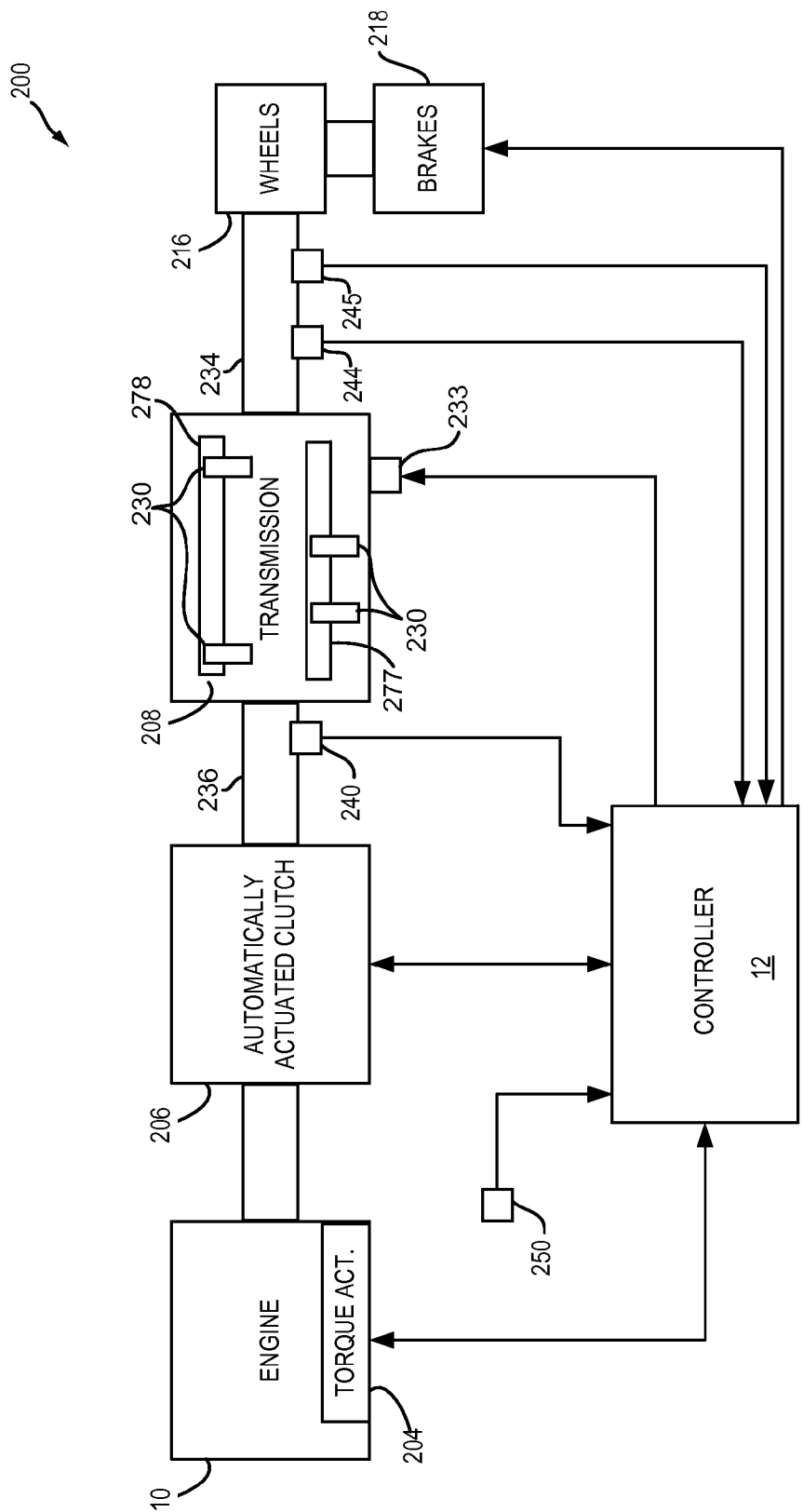
FIG. 2 is shows an example powertrain system layout.
Figure 3:
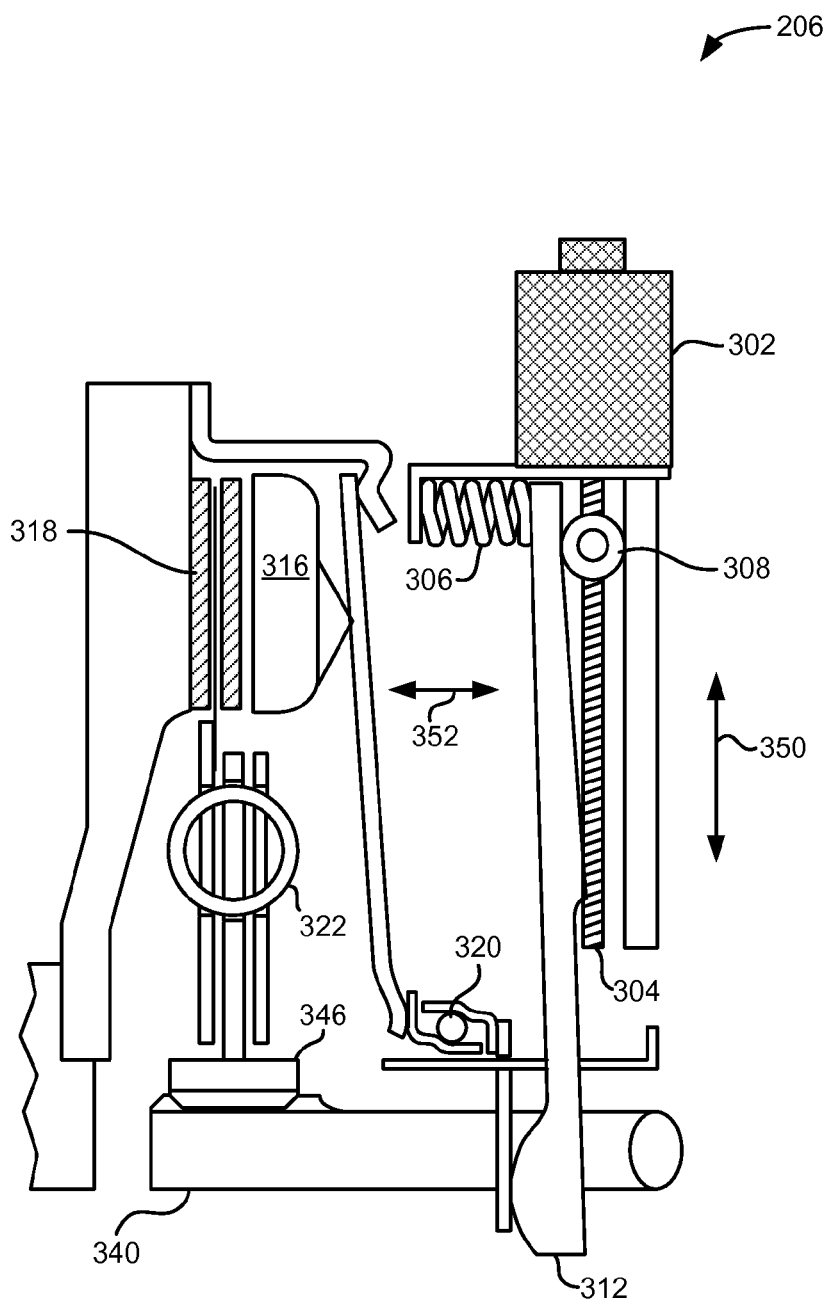
FIG. 3 is an example schematic diagram of a transmission clutch.
Figure 4:
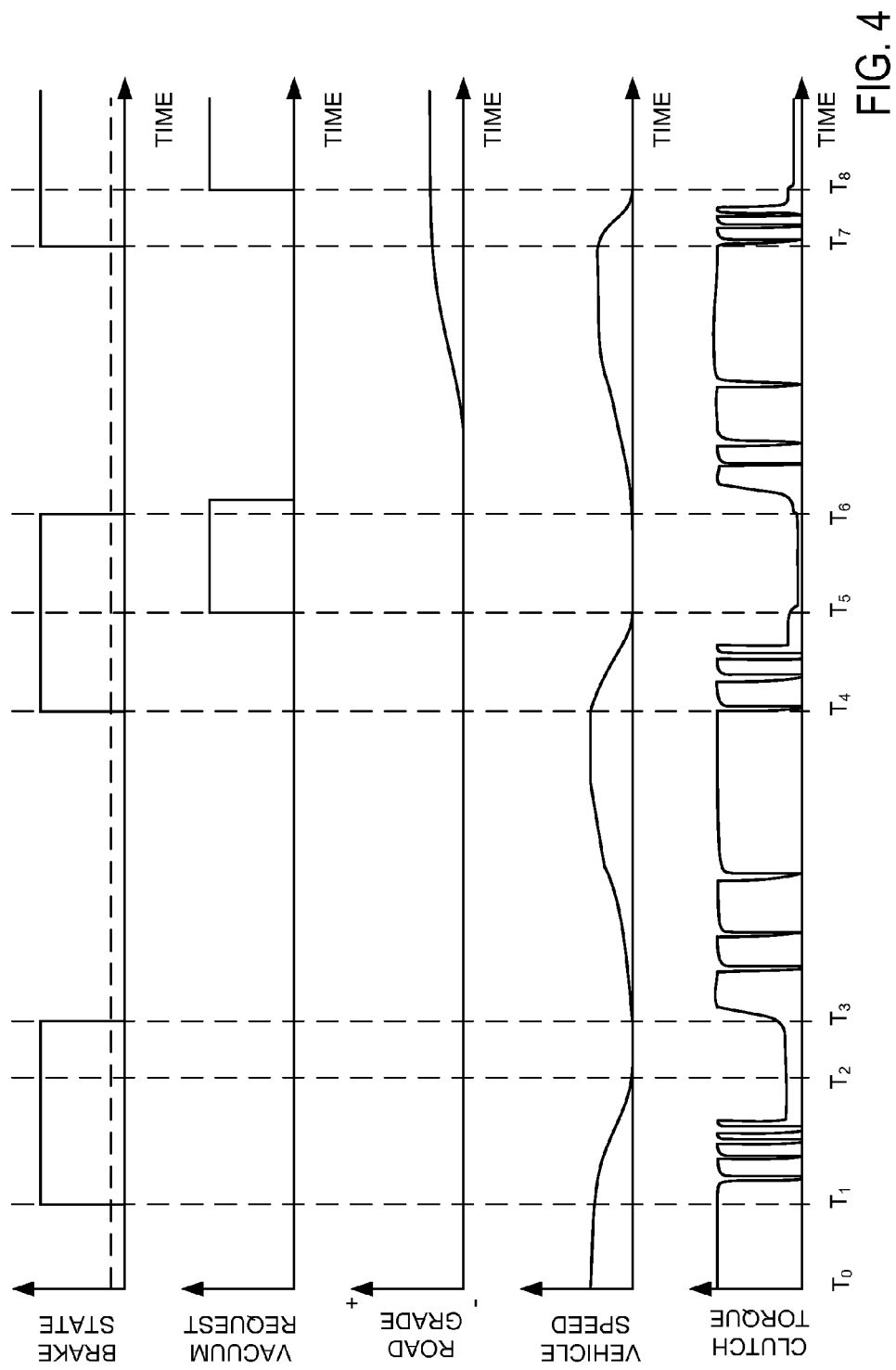
FIG. 4 is a plot of an example engine operating sequence.
Figure 5:
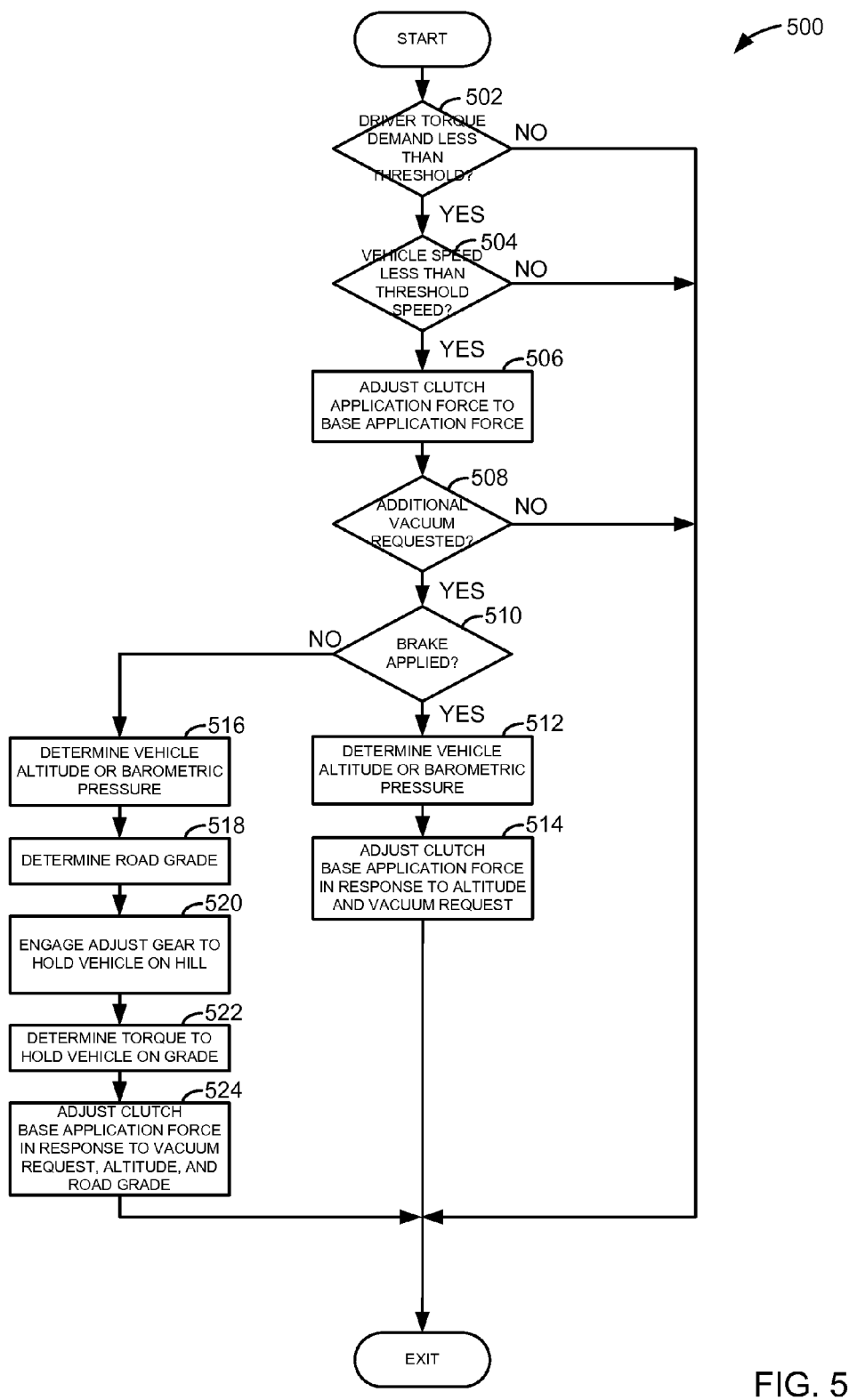
FIG. 5 is a flowchart of an example powertrain control method.

The present description is related to providing vacuum for vacuum consumers of a vehicle. In one non-limiting example, slip of a transmission input clutch is increased in response to a request for increased vacuum. Engine load may be reduced by increasing transmission clutch slip so that the engine may provide additional vacuum. In one example, the engine may be as illustrated in FIG. 1. Further, the engine may be part of a vehicle powertrain as illustrated in FIG. 2. FIG. 3 shows an example transmission input clutch for an Automatically Shifted Manual (ASM) transmission. In one example, the transmission input clutch may be electrically actuated. However, in other examples, the transmission input clutch or clutches may be hydraulically actuated. FIG. 4 shows an example operating sequence when the method of FIG. 5 is executed via a controller as shown in FIGS. 1 and 2.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Compressor 162 draws air from air intake 42 to supply boost chamber 46. Exhaust gases spin turbine 164 which is coupled to compressor 162 via shaft 161. Vacuum operated waste gate actuator 72 allows exhaust gases to bypass turbine 164 so that boost pressure can be controlled under varying operating conditions. Vacuum is supplied to waste gate actuator 72 via vacuum reservoir 138. Vacuum reservoir 138 may be supplied vacuum from intake manifold 44 via intake manifold vacuum flow control valve 24 and check valve 60. Intake manifold vacuum flow control valve 24 is operated via an electrical signal from controller 12. In some examples, check valve 60 may be omitted.

Vacuum reservoir 138 may also be supplied vacuum via ejector 20. Ejector vacuum flow control valve 22 may be opened to permit compressed air from compressor 162 to pass through ejector 20. Compressed air passes through ejector 20 and creates a low pressure region within ejector 20, thereby providing a vacuum source for vacuum reservoir 138. Air flowing through ejector 20 is returned to the intake system at a location upstream of compressor 162. In an alternative example, air flowing through the ejector 20 may be returned to the air intake system via conduits to the intake manifold at a location downstream of throttle 62 and at a location upstream of compressor 162. In the alternative configuration, valves may be placed between the outlet of ejector 20 and intake manifold 44 as well as between the outlet of ejector 20 and air intake 42. Check valve 63 ensures air does not pass from ejector 20 to vacuum reservoir 138. Air exits ejector 20 and reenters the engine air intake system at a location upstream of compressor 162.

While ejector 20 is useful for increasing intake manifold vacuum and increasing vacuum level, it may not have capacity to provide as much vacuum as is desired in a short amount of time. Further, the performance of ejector 20 may be reduced during times when accelerator pedal 130 is not depressed or when engine torque demand is low since vacuum provided by ejector 20 increases as air flow through ejector 20 increases. Consequently, it may be desirable to increase intake manifold vacuum via a plurality of control actions including reducing and/or eliminating creep torque while providing vacuum via ejector 20. In this way, ejector 20 may provide even deeper vacuum to the vehicle vacuum system.

Vacuum reservoir 138 provides vacuum to brake booster 140 via check valve 65. Vacuum reservoir 138 may also provide vacuum to other vacuum consumers such as turbocharger waste gate actuators, heating and ventilation actuators, driveline actuators (e.g., four wheel drive actuators), fuel vapor purging systems, engine crankcase ventilation, and fuel system leak testing systems. Check valve 61 limits air flow from vacuum reservoir 138 to secondary vacuum consumers (e.g., vacuum consumers other than the vehicle braking system). Brake booster 140 may include an internal vacuum reservoir, and it may amplify force provided by foot 152 via brake pedal 150 to master cylinder 148 for applying vehicle brakes (not shown).

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed via sensor 183 for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

FIG. 2 is a block diagram of a vehicle powertrain 200. Powertrain 200 may be powered by engine 10. Engine 10 may be started with an engine starting system (as shown in FIG. 1). Further, engine 10 may generate or adjust torque via torque actuator 204, such as a fuel injector, air inlet throttle, etc. ASM transmissions slip clutch 206 to mimic the creep torque provided historically from automatic transmissions with torque converters or fluid couplings.

An engine output torque may be transmitted to transmission input clutch 206 to drive automatically shifted manual transmission 208 via transmission input shaft 236. Clutch 206 may be comprised of one or more sets of clutch discs and one or more pressure plates as shown in FIG. 3. Further, one or more gears 230 coupled to first layshaft 278 or second layshaft 277 may be selectively engaged to propel a vehicle. In one example, the clutch 206 may be referred to as a component of the transmission. The position of clutch 206 may be adjusted to vary application force applied to clutch 206 to couple engine 10 to automatically shifted manual transmission 208. Clutch 206 may be electrically or hydraulically actuated.

Torque output from the automatically shifted manual transmission 208 may in turn be relayed to wheels 216 to propel the vehicle via transmission output shaft 234. Specifically, automatically shifted manual transmission 208 may transfer an input driving torque at the input shaft 236 responsive to a vehicle traveling conditions before transmitting an output driving torque to the wheels.

If the ASM stops producing a creep torque, it may be advantageous for the brake system to provide a torque that opposes vehicle reverse motion if the transmission is in a forward gear and opposes vehicle forward motion if the transmission is in a reverse gear. The brake system may increase brake system pressure during such conditions. Effectively, the vehicle brakes may function as a directional ratchet mechanism. It may do this in a number of ways, but one method is to arrange the transmission or wheel brakes to be self-actuating such that the intended motion is opposed with far less torqued than is the unintended motion. Further, a frictional force may be applied to wheels 216 by engaging wheel brakes 218. In one example, wheel brakes 218 may be engaged in response to the driver pressing his foot on a brake pedal (not shown). In the same way, a frictional force may be reduced to wheels 216 by disengaging wheel brakes 218 in response to the driver releasing his foot from a brake pedal. Further, vehicle brakes may apply a frictional force to wheels 216 as part of an automated engine stopping procedure.

Gear clutches 230 may be selectively applied via gear actuator 233. Gear actuator 233 may be electrically or hydraulically operated. Clutch 206 may be set to an open state when gear actuator 233 shifts between different gear ratios.

Transmission input speed may be monitored via transmission input shaft speed sensor 240. Transmission output speed may be monitored via transmission output shaft speed sensor 244. In some examples, inclinometer 250 may provide vehicle road grade data to controller 12 so that clutch 206 may be controlled (e.g., increase or decrease clutch apply pressure and adjust clutch engagement timing) via controller 12. In some examples, torque transmitted through transmission 208 may be determined via a torque sensor 245.

A controller 12 may be configured to receive inputs from engine 10, as shown in more detail in FIG. 1, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling air inlet throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

In some examples, wheel brakes 218 may be held in an applied state after a driver releases a brake pedal and before a threshold driver demand torque is provided. By holding the state of wheel brakes 218, it may be possible to reduce the possibility of the vehicle rolling when the driver releases the brake on a hill.

In alternative examples, transmission 208 may be an automatic transmission including a plurality of gear clutches 230. If transmission 208 is an automatic transmission 206 is a torque converter instead of an automated clutch. Creep may be reduced in an automatic transmission via slipping a gear clutch 230. For example, if the vehicle is stopped a gear clutch (e.g., $1^{st}$, $2^{nd}$, $3^{rd}$, or $4^{th}$ gear clutch) may be slipped to reduce creep torque.

The system of FIGS. 1 and 2 provide for a system for operating a vehicle powertrain, comprising: an engine; a transmission coupled to the engine that includes an electrically actuated clutch; and a controller including executable instructions stored in a non-transitory medium to reduce an application force of the electrically actuated clutch in response to a request for vacuum. The system includes where the request for vacuum is based on a pressure in a vacuum canister. The system further comprises an inclinometer, and additional executable instructions to determine road grade from the inclinometer. The system further comprises additional instructions for adjusting the application force (which in turn controls the creep force) in response to road grade. The system further comprises additional instructions for adjusting the application force in response to an altitude at which the engine is operated. The system includes where the engine includes a turbocharger, and additional instructions to adjust the application force in response to road grade when a vehicle brake is not applied.

Referring now to FIG. 3 an example clutch 206 is shown. Transmission input clutch 206 includes friction discs 318 that apply force to transfer torque to shaft 340 via spline 346. Damper spring 322 reduces oscillations through the transmission when force is applied to friction discs 318. Electric motor 302 rotates screw 304 and causes roller 308 to move linearly in the directions of arrows 350. Roller 308 acts on lever 312 to adjust the position of pressure plate 316 as indicated by arrows 352. Return spring 306 applies force opposing the force applied by electric motor 302 to lever 312 via roller 308. In this way, return spring 306 releases pressure plate 316 from applying force to friction discs 318 when roller 308 is in the position shown. Lever 312 transfers force from electric motor 302 to pressure plate 316 via engagement bearing 320.

Referring now to FIG. 4, a sequence showing example operation of the method of FIG. 6 in the system of FIGS. 1 and 2 executed via instructions stored in non-transitory memory of controller 12. Vertical markers at times $T_0$-$T_8$ indicate particular areas of interest during the sequence.

The first plot from the top of FIG. 4 is a plot of vehicle brake state versus time. The X axis represents time and time increases from the left side of the figure to right side of the figure. The Y axis represents vehicle brake state and the vehicle brake is applied when the vehicle brake state trace is at a higher level. The vehicle brake is not applied when the vehicle brake state trace is at a lower level.

The second plot from the top of FIG. 4 represents a vacuum request trace. The X axis represents time and time increases from the left side of the figure to right side of the figure. The Y axis represents vacuum request (e.g. additional vacuum requested) and vacuum is requested when the vacuum request trace is at a higher level. Vacuum is not requested when the vacuum request trace is at a lower level.

The third plot from the top of FIG. 4 represents road grade versus time. The X axis represents time and time increase from the left side of the figure to the right side of the figure.

The Y axis represents road grade and road grade is positive above the X axis and it increases in the direction of the Y axis arrow.

The fourth plot from the top of FIG. 4 represents vehicle speed versus time. The X axis represents time and time increases from the left side of the figure to the right side of the figure. The Y axis represents vehicle speed and vehicle speed increases in the direction of the Y axis arrow.

The fifth plot from the top of FIG. 4 represents the transmission input clutch application force command. The X axis represents time and time increases from the left side of the figure to the right side of the figure. The Y axis represents the transmission input clutch application force command and the transmission input clutch application force command increases in the direction of the Y axis arrow. The greater the transmission application force the greater amount of engine torque is transferred from the engine to the transmission.

At time $T_0$, engine speed is constant and transmission input clutch application force is at a higher level. Road grade is zero and no vacuum is presently being requested. The brake state is low indicating that the vehicle brake is not applied.

At time $T_1$, the vehicle brake is applied by a driver (not shown) and the vehicle speed begins to decrease in response to the brake application. Application of the vehicle brake consumes vacuum from a vacuum reservoir. The road grade and vacuum request remain at zero and not asserted. The transmission input clutch application force remains at a higher level.

Between time $T_1$ and time $T_2$, the vehicle speed continues to decrease and the transmission input clutch application torque is shown increasing and decreasing as the transmission is downshifted in response to vehicle speed and driver demand torque. The vehicle brake remains in an applied state and the vacuum request remains low and not asserted so that additional vacuum is not requested. As vehicle speed approaches zero the transmission input clutch application torque is reduced to a base level that is sufficient to propel the vehicle at a low speed (e.g., less than 8 Km/hr) when the vehicle brake is not applied and when the vehicle is traveling on a road with zero grade. The transmission input clutch application torque is changed in response to vehicle speed and driver demand torque.

At time $T_2$, the vehicle reaches a stopped state and the road grade and vacuum request remain at zero and not asserted. The brake remains applied by the driver and the transmission input clutch application force remains at the base level.

At time $T_3$, the vehicle brake is released and the transmission input clutch application force increases with an increasing driver demand torque (not shown). The road grade is zero and the vacuum request remains not asserted.

Between time $T_3$ and time $T_4$, the vehicle accelerates and the transmission input clutch is applied and released as the transmission is shifted. The road grade remains at zero and the vacuum request remains not asserted. The brake is not applied.

At time $T_4$, the vehicle brake is applied and vehicle speed begins to be reduced. The transmission input clutch application torque decreases and increases as the transmission is downshifted in response to vehicle speed and driver demand torque. The road grade remains at zero and the vacuum request remains not asserted.

Between time $T_4$ and time $T_5$, the transmission input clutch application force is decreased and increased several times as the transmission is downshifted in response to vehicle speed and driver demand torque. The vehicle speed continues to decline and the vacuum request remains not asserted. As vehicle speed approaches zero, the transmission input clutch application force is reduced to the base application force in response to vehicle speed and driver demand torque.

At time $T_5$, the vacuum request is asserted (e.g., transitions to a higher level) in response to a pressure in a vacuum reservoir (not shown). This measured vacuum may be either the brake booster vacuum, a vacuum reservoir, a node in the vacuum harness, or the engine intake manifold vacuum. Thus, the vacuum system is requesting vacuum to power vacuum consumers such as the brake booster. The transmission input clutch application torque is reduced in response to the request for vacuum. By reducing the clutch application torque, less engine torque is used to rotate the engine at idle speed so that less air is drawn into the intake manifold, thereby producing additional vacuum for the vacuum system. The road grade remains at zero and the brake remains applied.

When a vehicle is braked and stopped, the operator may not sense the level of creep torque (except for tertiary effects) because brake application force far exceeds the creep torque. Thus, the first time an operator may sense a reduced level of creep is upon releasing the brake and before applying the accelerator. If vacuum is replenished to a desired level before a driver releases the brake, the base level of creep force (e.g., a creep force provided when vacuum is not requested) may be restored.

Between time $T_5$ and time $T_6$, the transmission input clutch application torque remains at a reduced level and the engine provides vacuum to the vacuum system. In conditions where the engine is capable of providing vacuum when the transmission input clutch application torque is at a base level, the engine vacuum is increased. The brake remains applied and the vacuum request remains asserted.

At time $T_6$, the brake pedal is released and the transmission input clutch application torque is increased to a level that is below the base transmission input clutch application torque in response to releasing the brake pedal. The transmission input clutch application torque is increased to reduce driveline gear lash and to provide a small torque to the wheels. The engine produces vacuum at a reduced level as compared between time $T_5$ and time $T_6$; however, vehicle driveline lash may be reduced and vehicle acceleration may be improved.

Between time $T_6$ and time $T_7$, the transmission input clutch application force is increased and decreased several times as the transmission is shifted in response to increasing vehicle speed and driver demand torque (not shown). The vacuum request remains not asserted and the vehicle brake is not applied. The road grade increases and then stabilizes at a level greater than zero. The road grade is positive indicating that the vehicle is traveling up hill.

At time $T_7$, the driver applies the vehicle brake and the vehicle begins to decelerate. The vacuum request remains not asserted and the road grade remains at the elevated level.

Between time $T_7$ and time $T_8$, the transmission input clutch application force is decreased and increased as the transmission is downshifted in response to vehicle speed and driver demand torque (not shown). The transmission input clutch application force is also reduced to a base level as vehicle speed approaches zero. The road grade remains positive and elevated.

At time $T_8$, the vacuum request is asserted in response to a low vacuum level in a vacuum reservoir. However, with a slow or stopped vehicle, when the vehicle is traveling uphill in a forward gear, a low vacuum in the brake booster may not be an issue since the grade opposes vehicle forward motion. It may be desirable to reduce the possibility of the vehicle rolling backwards. Thus, base creep torque is provided rather than trying to address a possible booster vacuum deficiency. The same is true for going uphill in reverse gear. On the other hand, if the vehicle is traveling downhill in the direction of transmission selected direction (e.g., forward gear), vacuum is increased via reducing creep torque from base creep torque (e.g., zero creep torque).

Further, the amount or magnitude of creep torque is adjustable in response to road grade. For example, if the road grade is a positive steeper grade and the vehicle is in a forward gear and headed uphill while vacuum is requested, the base creep is provided. If the road grade is a positive middle level grade and the vehicle is in a forward gear and headed uphill while vacuum is requested, the creep torque is reduced from the base creep torque (e.g., ⅔ of the base creep torque is provided). If the road grade is a positive lower level grade and the vehicle is in a forward gear and headed uphill while vacuum is requested, the base creep is reduced further approaching zero creep (e.g., ⅕ base creep torque). On the other hand, if the road grade is a negative steeper grade and the vehicle is in a forward gear and headed downhill while vacuum is requested, the base creep may be reduce a greater amount (e.g., zero creep). If road grade is a negative middle grade and the vehicle is in a forward gear and headed downhill while vacuum is requested, the base creep torque is reduced less (e.g., 1/16 creep torque is provided). If road grade is a negative lower grade and the vehicle is in a forward gear and headed downhill while vacuum is requested, the base creep torque is reduced even less (e.g., ⅛ creep torque is provided). Similar actions may be provided for operating the transmission in reverse and traveling up or down hill. If vacuum is not requested, the base creep torque may be provided.

In this way, creep torque may be selectively adjusted in response to road grade, transmission gear, and road grade. Additionally, the creep force in the above examples may be adjusted in response to the difference between the desired vacuum in the vacuum system and the actual vacuum in the vacuum system. For example, if there is a greater difference between the actual system vacuum and the desired system vacuum while the vehicle is in a forward gear and traveling downhill, the creep force may be reduced an additional amount based on the difference between desired and actual system vacuum. On the other hand, if there is a less difference between the actual system vacuum and the desired system vacuum while the vehicle is in a forward gear and traveling downhill, the creep force may not be reduced an additional amount based on the difference between desired and actual system vacuum.

As mentioned, creep torque is adjustable for an ASM transmission via slipping the automatically actuated clutch while creep torque for an automatic transmission may be reduced via increasing slip of gear clutches. In this way, creep torque is adjustable for mountain conditions.

The transmission input clutch application force is reduced to a level less than the application force level at time $T_2$ and more than the application force level between times $T_5$ and $T_6$. The transmission input clutch application force is adjusted from the base level based on the road grade and vacuum request so that the vehicle has less possibility of rolling in a reverse direction if the brakes are released while the engine is providing vacuum. The vehicle brakes are maintained in an applied state.

Referring now to FIG. 5, a method for an example powertrain control is shown. The method of FIG. 5 may be executed by the system shown in FIGS. 1 and 2 executing instructions stored in non-transitory memory. The method of FIG. 5 may provide the sequence shown in FIG. 4.

At 502, method 500 judges whether or not driver demand torque is less than a threshold torque request. The driver demand torque may be requested by a driver via an accelerator pedal or other input device. If driver demand torque is less than a threshold torque, the answer is yes and method 500 proceeds to 504. Otherwise, the answer is no and method 500 exits. In the simplest case, if the operator is not applying the accelerator pedal, then 502 returns a yes answer and method 500 proceeds to 504.

At 504, method 500 judges whether or not vehicle speed is less than a threshold speed. Vehicle speed may be determined from a wheel speed sensor or a transmission shaft speed sensor. If vehicle speed is less than a threshold speed, the answer is yes and method 500 proceeds to 506. Otherwise, the answer is no and method 500 exits.

In some examples, 504 may judge whether to proceed to 506 or exit based on synchronous speed. If the clutch input shaft and output shaft are going at the same speed, they are at a synchronous speed. If the engine side of the clutch is rotating slower than the transmission (vehicle wheel) side, engine braking is performed and method 500 proceeds to exit. If the engine side of the clutch is rotating faster than the transmission side, engine torque may be applied to the wheels, thereby producing creep and method 500 proceeds to 506. For an ASM vehicle, the automatically actuated clutch is adjusted to give a target creep characteristic in torque, acceleration, or speed.

At 506, method 500 applies a base application force to the transmission input clutch. In one example, the base application force is an amount of force that allows engine torque to propels the vehicle at a predetermined speed (e.g., less than 8 Km/hr) when the driver demand torque is zero. In one example, the base application force is empirically determined and stored to memory. Method 500 proceeds to 508 after the base application force is an amount of force is applied to the transmission input clutch.

At 508, method 500 judges whether or not additional vacuum is requested by the vacuum system. The vacuum system may request additional vacuum when pressure in a vacuum reservoir increases to a pressure greater than a threshold pressure. If method 500 judges that there is a request for additional vacuum, the answer is yes and method 500 proceeds to 510. Otherwise, the answer is no and method 500 proceeds to exit.

At 510, method 500 judges whether or not the vehicle brakes are applied. Output of a brake pedal sensor may be used to determine whether or not the vehicle brakes are applied. If method 500 judges that brakes are applied, the answer is yes and method 500 proceeds to 512. Otherwise, the answer is no and method 500 proceeds to 516.

In the 512-514 path, the vehicle motion is controlled by the vehicle brake and creep torque may be significantly reduced to fulfill the vacuum request. At 512, method 500 determines vehicle altitude and/or barometric pressure. In one example, method 500 determines barometric pressure via a barometric pressure sensor. In other examples, method 500 may determine vehicle altitude via a satellite based global positioning system. Method 500 proceeds to 514 after barometric pressure and/or vehicle altitude are determined.

At 514, method 500 adjusts a base transmission input clutch application force in response to the vacuum request and barometric pressure or altitude. In one example, a difference between a desired vacuum level and an actual vacuum level is determined via subtracting the present vacuum level in the vacuum reservoir from the desired vacuum level. The result is used to index a table or function that stores empirically determined adjustments to the base transmission input clutch application force. If the difference between the present vacuum level and the desired vacuum level is small, the base transmission input clutch application force is reduced by a small amount so that engine output torque is reduced. If the difference between the present vacuum level and the desired vacuum level is large, the base transmission input clutch application force is reduced by a larger amount so that engine output torque is reduced further than if the difference is small. Reducing the transmission input clutch application force increases clutch slip and reduces the amount of torque transferred from the engine to the vehicle wheels. Increasing the transmission input clutch application force decreases clutch slip and increases the amount of torque transferred from the engine to the vehicle wheels.

If the engine is being operated near sea level, no adjustments are made to the base transmission input clutch application force in response to barometric pressure. If the engine is being operated at a higher altitude, the transmission input clutch application force is increased toward the base transmission input clutch application force when the base transmission input clutch application force has been reduced in response to the vacuum request. The specific amount that the transmission input clutch application force is adjusted may vary from application to application. Method 500 proceeds to exit after the transmission input clutch application force is adjusted.

Thus, the transmission input clutch application force may be reduced in response to a request for vacuum; however, the reduction in transmission input clutch application force may be decreased in response to vehicle altitude since less air is available at lower barometric pressures. In this way, the amount of vacuum that may be provided by the engine may be limited while the engine rotates at a desired idle speed.

At 516, method 500 determines vehicle altitude and/or barometric pressure as described at 512. Additionally, brake force may be determined via monitoring brake fluid pressure or brake pedal position. Method 500 proceeds to 518 after barometric pressure and/or altitude are determined.

At 518, method 500 determines road grade. In one example, output of an inclinometer is converted to road grade. Road grade is positive for a vehicle engaged in a forward gear and traveling uphill. Road grade is negative for a vehicle engaged in a forward gear and traveling downhill. Method 500 proceeds to 520 after road grade is determined.

At 520, method 500 selects a transmission gear for holding the vehicle on the hill. In one example, the transmission gear is a higher gear than $1^{st}$ gear (e.g., third gear) so that the perceived vehicle mass increases and so that less engine torque is used to hold the vehicle on the hill. If the driver demand torque increases, the transmission may be shifted to a lower gear to accelerate the vehicle. Method 500 proceeds to 522 after the transmission gear is selected.

At 522, method 500 determines an amount of torque the transmission input clutch transfers from the engine to the transmission to hold the vehicle on the grade determined at 518.

If the grade is negative, the amount of torque is reduced from base creep torque toward zero torque depending on the difference between desired system vacuum and actual system vacuum as well as the grade level or amount estimate. If the grade is positive the wheel torque is determined via the following equation:

$$Tw = RR \cdot Mv \cdot g \cdot \sin \Theta + Tr$$

Where: Tw is wheel torque on grade angle θ, RR is driven wheel rolling radius, My is mass of the vehicle, g is acceleration due to gravity, θ is the grade angle, and Tr is the road load torque ant the driven wheel on grade angle θ. The torque at the wheel is then adjusted based on the presently selected transmission gear ratio to determine the transmission input clutch hill hold torque to transfer through the transmission input clutch. In this way, the creep torque is adjusted for grade. Additionally, the wheel torque may be adjusted responsive to a difference in actual vacuum and desired vacuum in the vacuum system as described in FIG. 4. Further, FIG. 4 describes several examples of adjusting creep torque according to method 500. Additionally, creep torque may be decreased in response to applied brake force as determined via brake line pressure. For example, if applied brake force is greater than a threshold brake force, the base creep force may be reduced by a first amount. If brake force is less than the threshold brake force, the base creep force may be reduced by a second amount, the second amount less than the first amount. Method 500 proceeds to 524 after the transmission input clutch hill hold torque is determined.

At 524, method 500 adjusts a base transmission input clutch application force or gear clutch in response to the vacuum request, barometric pressure or altitude, and road grade. In one example, an adjustment to the base transmission input clutch application force based on the vacuum request is determined as described at 514. Further, if the engine is being operated near sea level, no adjustments are made to the base transmission input clutch application force in response to barometric pressure. If the engine is being operated at a higher altitude, the transmission input clutch application force is increased toward the base transmission input clutch application force when the base transmission input clutch application force has been reduced in response to the vacuum request. The specific amount that the transmission input clutch application force is adjusted may vary from application to application. Additionally, the base transmission input clutch application force is adjusted based on the transmission input clutch hill hold torque. In particular, the transmission input clutch hill hold torque indexes a table of empirically determined clutch application force values using the transmission input clutch hill hold torque and the table outputs an adjustment to the base transmission input clutch application force. Method 500 proceeds to exit after the transmission input clutch application force is adjusted.

In this way, the transmission input clutch application force may be adjusted in response to a request for vacuum, altitude, and road grade. In some examples, the vacuum request may be given higher priority than the adjustment for road grade so that little if any adjustment is provided for road grade when additional vacuum is requested.

Thus, the method of FIG. 5 provides for operating a vehicle powertrain, comprising: reducing torque delivered from an engine to vehicle wheels via reducing a torque transferred via a clutch in response to a request to a request for increased vacuum. The includes where the request for increased vacuum is based on a pressure in a vacuum reservoir. The method further comprises operating the engine at an idle speed while reducing torque delivered from the engine to the vehicle wheels. The method includes where the clutch is automatically adjusted via a controller. The method of claim 1, where the torque transferred via the clutch is reduced via slipping the clutch and reducing a clutch application force. The method includes where the clutch is a transmission input clutch. The method further comprises providing vacuum to a vacuum reservoir via an engine intake manifold in response to the request for increased vacuum.

In another example, the method of FIG. 5 provides for a method for operating a vehicle powertrain, comprising: delivering a first torque from an engine to wheels of a vehicle when the vehicle is stopped in the absence of a request for vacuum; and delivering a second torque from the engine to the wheels of the vehicle when the vehicle is stopped in response to a request for additional vacuum, the second torque less than the first torque. The method includes where vehicle brakes are applied while the vehicle is stopped. The method further comprises adjusting the second torque in response to an altitude at which the engine is being operated. The method further comprises adjusting the second torque in response to a grade the vehicle is on.

In some examples, the method includes where the request for vacuum is based on a vacuum level within a vacuum reservoir. The method includes where the second torque is based on a difference between a vacuum level of a vacuum reservoir and a desired vacuum level. The method includes where the first torque and the second torque are delivered to the wheels of the vehicle via an automatically shifted manual transmission.

Additionally, the method of FIG. 5 provides for method for operating a vehicle powertrain, comprising: reducing torque delivered from an engine to vehicle wheels via reducing a torque transferred via a clutch in response to a vehicle being engaged in a forward gear and traveling downhill. The method further comprises reducing torque delivered from the engine to the vehicle wheels in response to a request for increased vacuum, and where the request for increased vacuum is based on a pressure in a vacuum reservoir. The method of claim 1, further comprising operating the engine at an idle speed while reducing torque delivered from the engine to the vehicle wheels, and further reducing torque delivered from the engine to vehicle wheels in response to applied vehicle brake force. The method includes where the clutch is automatically adjusted via a controller, and further comprises applying a base torque delivered from the engine to vehicle wheels in response to the vehicle being engaged in a forward gear and traveling uphill. The method includes where the torque transferred via the clutch is reduced via slipping the clutch and reducing an clutch application force, and further comprises applying a base torque delivered from the engine to vehicle wheels in response to the vehicle being engaged in a forward gear and traveling on a zero grade road.

As will be appreciated by one of ordinary skill in the art, routines described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle powertrain, comprising:
reducing torque delivered from an engine to vehicle wheels via reducing a torque transferred via a clutch in response to a vehicle being engaged in a forward gear and traveling downhill.

2. The method of claim 1, further comprising reducing torque delivered from the engine to the vehicle wheels in response to a request for increased vacuum, and where the request for increased vacuum is based on a pressure in a vacuum reservoir.

3. The method of claim 1, further comprising operating the engine at an idle speed while reducing torque delivered from the engine to the vehicle wheels, and further reducing torque delivered from the engine to vehicle wheels in response to applied vehicle brake force.

4. The method of claim 1, where the clutch is automatically adjusted via a controller, and further comprising applying a base torque delivered from the engine to vehicle wheels in response to the vehicle being engaged in a forward gear and traveling uphill.

5. The method of claim 1, where the torque transferred via the clutch is reduced via slipping the clutch and reducing an clutch application force, and further comprising applying a base torque delivered from the engine to vehicle wheels in response to the vehicle being engaged in a forward gear and traveling on a zero grade road.

6. The method of claim 1, where the clutch is a transmission input clutch.

7. The method of claim 1, further comprising providing vacuum to a vacuum reservoir via an engine intake manifold in response to the request for increased vacuum.

8. A method for operating a vehicle powertrain, comprising:
delivering a first torque from an engine to wheels of a vehicle when the vehicle is stopped in the absence of a request for vacuum; and
delivering a second torque from the engine to the wheels of the vehicle when the vehicle is stopped in response to a request for additional vacuum, the second torque less than the first torque.

9. The method of claim 8, where vehicle brakes are applied while the vehicle is stopped.

10. The method of claim 8, further comprising adjusting the second torque in response to an altitude at which the engine is being operated.

11. The method of claim 8, further comprising adjusting the second torque in response to a grade the vehicle is on.

12. The method of claim 8, where the request for vacuum is based on a vacuum level within a vacuum reservoir.

13. The method of claim 8, where the second torque is based on a difference between a vacuum level of a vacuum reservoir and a desired vacuum level.

14. The method of claim 8, where the first torque and the second torque are delivered to the wheels of the vehicle via an automatically shifted manual transmission.

15. A system for operating a vehicle powertrain, comprising:
an engine;
a transmission coupled to the engine that includes an electrically actuated clutch; and
a controller including executable instructions stored in a non-transitory medium to reduce an application force of the electrically actuated clutch in response to a request for vacuum.

16. The system of claim 15, where the request for vacuum is based on a pressure in a vacuum canister.

17. The system of claim 15, further comprising an inclinometer, and additional executable instructions to determine road grade from the inclinometer.

18. The system of claim 17, further comprising additional instructions for adjusting the application force in response to road grade.

19. The system of claim 18, further comprising additional instructions for adjusting the application force in response to an altitude at which the engine is operated.

20. The system of claim 15, where the engine includes a turbocharger, and additional instructions to adjust the application force in response to road grade when a vehicle brake is not applied.

\* \* \* \* \*